United States Patent
Nijhuis et al.

(10) Patent No.: US 10,774,892 B2
(45) Date of Patent: Sep. 15, 2020

(54) FRICTION MATERIAL COMPRISING ARAMID

(71) Applicant: TEIJIN ARAMID B.V., Arnhem (NL)

(72) Inventors: Walter Nijhuis, Hengelo (NL); Frank Diedering, Deventer (NL); Jan-Cees Tiecken, Didam (NL)

(73) Assignee: TEIJIN ARAMID B.V., Arnhem (NL)

( * ) Notice: Subject to any disclaimer, the term of this patent is extended or adjusted under 35 U.S.C. 154(b) by 13 days.

(21) Appl. No.: 16/327,088

(22) PCT Filed: Aug. 22, 2017

(86) PCT No.: PCT/EP2017/071154
§ 371 (c)(1),
(2) Date: Feb. 21, 2019

(87) PCT Pub. No.: WO2018/037015
PCT Pub. Date: Mar. 1, 2018

(65) Prior Publication Data
US 2019/0211895 A1   Jul. 11, 2019

(30) Foreign Application Priority Data

Aug. 24, 2016 (EP) ..................................... 16185521

(51) Int. Cl.
*F16D 69/02* (2006.01)
*D21H 13/26* (2006.01)
(Continued)

(52) U.S. Cl.
CPC ........... *F16D 69/026* (2013.01); *D21H 13/26* (2013.01); *D21H 17/34* (2013.01); *D21H 17/48* (2013.01);
(Continued)

(58) Field of Classification Search
None
See application file for complete search history.

(56) References Cited

U.S. PATENT DOCUMENTS 5,073,440 A * 12/1991 Lee .......................... C08L 77/10
442/309
5,399,431 A    3/1995 Miess et al.
(Continued)

FOREIGN PATENT DOCUMENTS

| WO | 2005/059211 A1 | 6/2005 |
| WO | 2006/012040 A1 | 2/2006 |
| WO | 2007/076335 A2 | 7/2007 |

OTHER PUBLICATIONS

Sep. 14, 2017 International Search Report issued in International Patent Application No. PCT/EP2017/071154.

*Primary Examiner* — Dennis R Cordray
(74) *Attorney, Agent, or Firm* — Oliff PLC

(57) ABSTRACT

A friction paper including filler, para-aramid pulp, and resin, characterised in that the para-aramid pulp includes 0.1 to 10 wt. % of polyvinyl pyrrolidone (PVP), the paper having a grammage in the range of 100 to 800 g/m2. It has been found that the use of a PVP-containing para-aramid pulp leads to improved friction performance as compared to the use of para-aramid pulp not containing PVP. Effects obtained include improved friction properties, improved strength properties, and improved filler retention.

14 Claims, 1 Drawing Sheet

(51) Int. Cl.
*D21H 17/68* (2006.01)
*D21H 17/34* (2006.01)
*D21H 17/48* (2006.01)
*D21H 23/04* (2006.01)
*D21H 21/18* (2006.01)
*D21H 27/00* (2006.01)
*F16D 13/52* (2006.01)

(52) U.S. Cl.
CPC ............ *D21H 17/68* (2013.01); *D21H 21/18* (2013.01); *D21H 23/04* (2013.01); *D21H 27/00* (2013.01); *F16D 13/52* (2013.01); *F16D 2200/0069* (2013.01); *F16D 2200/0095* (2013.01)

(56) References Cited

U.S. PATENT DOCUMENTS

| | | | |
|---|---|---|---|
| 5,532,059 A * | 7/1996 | Lee | D01D 5/38 428/359 |
| 6,303,221 B1 | 10/2001 | Prior et al. | |
| 2019/0127918 A1* | 5/2019 | Afshari | D21H 15/10 |

* cited by examiner

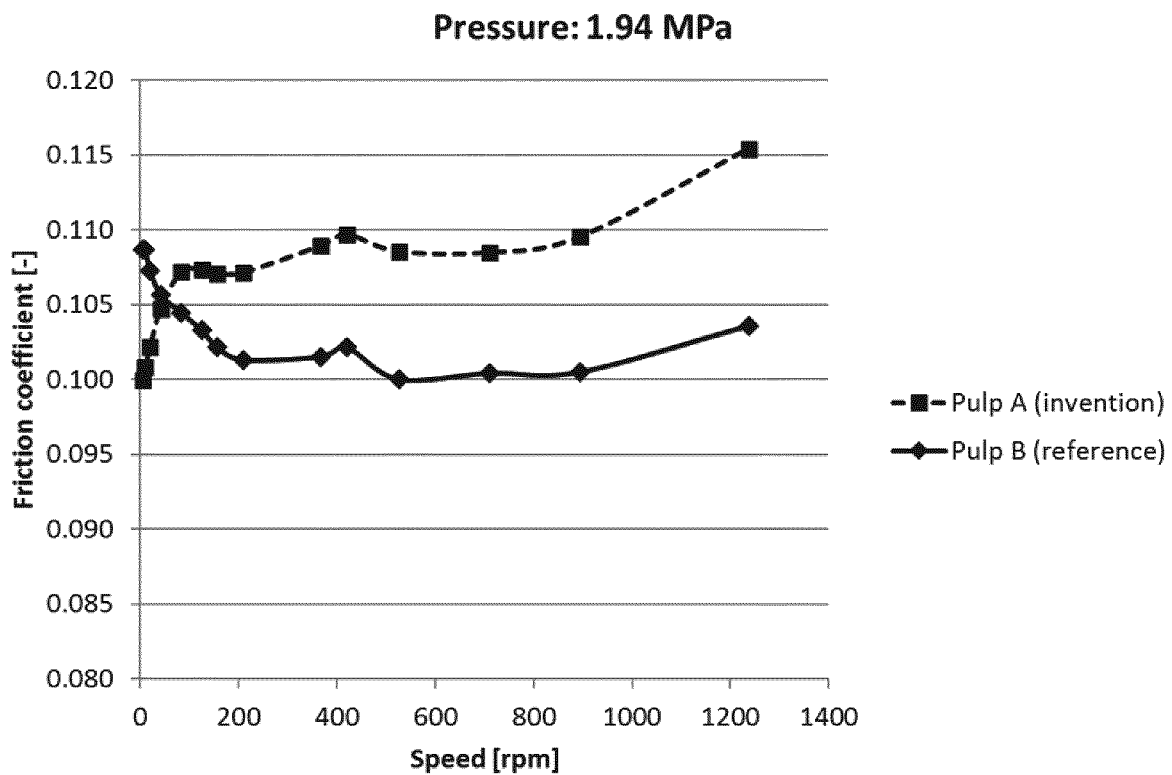
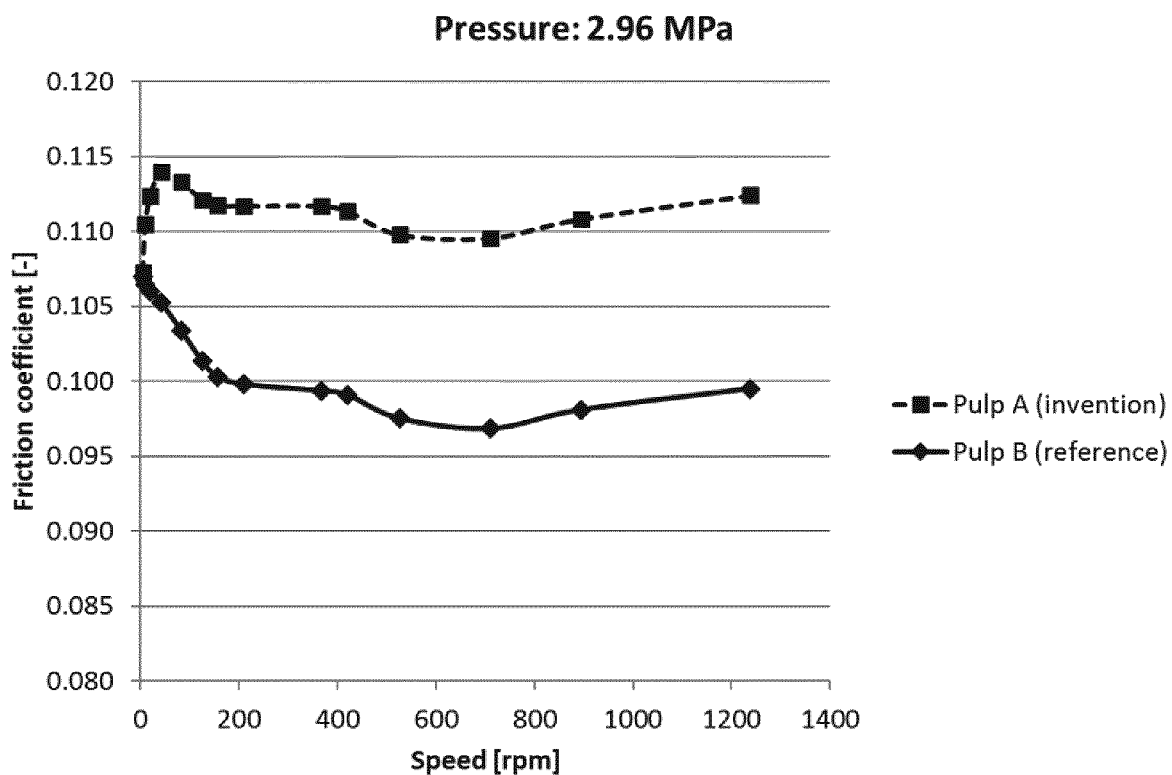

FRICTION MATERIAL COMPRISING ARAMID

The present invention is directed to a friction material comprising aramid.

Friction papers, or paper-based friction materials, are used in wet friction application such as clutch facings in automatic transmissions. These paper-type materials are typically bonded to support members for use in mechanical energy transfer applications. Friction papers are manufactured by the conventional paper-making method, but these materials are in fact elaborate composite structures comprising pulp, fillers, and a binder, usually phenolic resin, and optionally further components such as fibers and friction additives.

Multi-plate wet clutches and brakes have been proven to be ideal torque transfer devices for high energy applications. The multi-plate clutch comprises alternate friction and steel plates which interact within an oil cooled tribological system to transmit the desired torque. Multi-plate "wet" clutches are used in a broad spectrum of applications such as clutches in double clutch transmissions, torque converter lock-up clutches, clutches and brakes in automatic transmissions, wheel and axle brakes, differential locks, all-wheel drive transfer cases, power take offs, and master clutches.

Friction papers are composite materials that are formulated to give appropriate friction, noise control, temperature resistance, and wear properties in each specific application. They comprise a number of different materials, each contributing to the properties of the paper.

Reinforcing fibers are often present to increase the mechanical strength and durability of the system. They further help to provide a porous structure, which helps to ensure proper resin absorption.

Fillers are added to fulfill various functions, e.g., to assist in resin absorption, to promote oil flow through the paper to control in-use temperature degradation, to ensure adequate friction performance, and/or to reduce noise. A resin is present to ensure a good dimensional stability, a good tribological performance, and a good heat resistance.

Pulp materials are present to increase the mechanical strength, the porosity of the paper, and the retention of fillers. WO2007076335 describes the use of PIPD fibers or pulp in friction papers. WO2006/012040 describes an acrylic and para-aramid pulp for use as reinforcement material in products such as seals and friction material.

Para-aramid pulp is often used as pulp material in friction papers. It shows good heat resistance, friction performance, and durability. It further shows good properties as regard noise and vibration behaviour (NVH) and does not show chemical interaction with the automatic transmission fluid (ATF). It also has good compressibility and shear strength properties, and good flexibility as compared to metal fibers.

Nevertheless, it has been found that there is still room for improving the performance of para-aramid pulp in friction papers. In particular there is need for improvement as regards friction performance, strength, and loss of resin particles and filler.

The present invention provides a solution to this problem. The invention pertains to a friction paper comprising filler, para-aramid pulp, and resin, characterised in that the para-aramid pulp comprises 0.1 to 10 wt. % of polyvinyl pyrrolidone (PVP), the paper having a grammage in the range of 100 to 800 g/m2.

It has been found that the use of a PVP-containing para-aramid pulp leads to improved friction performance as compared to the use of para-aramid pulp not containing PVP. Effects obtained include improved friction properties, improved strength properties, and improved filler retention. Further advantages of the present invention and specific embodiments thereof will become clear from the further specification.

BRIEF DESCRIPTION OF DRAWINGS

FIG. 1 (top): Friction coefficient of Pulp A (invention) and Pulp B (reference) at various rotation speeds and a pressure of 1.94 MPa.

FIG. 1 (bottom): Friction coefficient of Pulp A (invention) and Pulp B (reference) at various rotation speeds and a pressure of 2.96 MPa.

The present invention and the effects associated therewith will be described in more detail below.

It is a key feature of the present invention that the friction paper comprises para-aramid pulp comprising 0.1 to 10 wt. % of polyvinyl pyrrolidone (PVP).

In the context of the present specification the term aramid refers to an aromatic polyamide which is a condensation polymer of aromatic diamine and aromatic dicarboxylic acid halide. Aramids may exist in the meta- and para-form. Para-aramid is used in the present invention. In the context of the present specification the term para-aramid refers to aramid wherein at least 85% of the bonds between the aromatic moieties are para-aramid bonds. As typical members of this group are mentioned poly(paraphenylene terephthalamide), poly(4,4'-benzanilide terephthalamide), poly(paraphenylene-4,4'-biphenylenedicarboxylic acid amide) and poly (paraphenylene-2,6-naphthalenedicarboxylic acid amide or copoly(para-phenylene/3,4'-dioxydiphenylene terephthalamide).

The use of aramid wherein at least 90%, more in particular at least 95%, of the bonds between the aromatic moieties are para-aramid bonds is considered preferred. The use of poly(paraphenylene terephthalamide), also indicated as PPTA, is particularly preferred.

PVP, polyvinyl pyrrolidone, is known in the art and commercially available. It may, e.g., have been obtained by linear polymerization of N-vinyl-2-pyrrolidone. The PVP used in the present invention generally has a weight average molecular weight in the range of 5 to 2500 kg/mol. It may be preferred for the PVP to have a weight average molecular weight of 8 to 1500 kg/mol. Lower molecular weights may be preferred to obtain good properties. Therefore, it may be preferred for the PVP to have a weight average molecular weight in the range of 10 to 1000 kg/mol, in particular 10-500 kg/mol, more in particular 10-200 kg/mol, in some embodiments 10-100 kg/mol, or even 10-60 kg/mol.

The PVP-containing para-aramid pulp comprises 0.1 to 10 wt. % of polyvinyl pyrrolidone (PVP). If less then 0.1 wt. % of PVP is present, the beneficial effect of the invention will not be obtained. If more than 10 wt. % is present, no additional benefit will be gained. It is considered preferred for the amount of PVP to be in the range of 0.5 to 6 wt. %.

The PVP-containing aramid pulp used in the present invention generally has a length ($LL_{0.25}$) in the range of 0.7 to 1.5 mm, in particular in the range of 0.9 to 1.5 mm, in some embodiments in the range of 0.9 to 1.3 mm. This parameter is determined by the Pulp Expert™ FS apparatus which is calibrated with samples of pulp with known lengths. The length weighted length $LL_{0.25}$ [mm] is a length-weighted average length wherein particles are included having a length >250 µm, i.e. >0.25 mm.

The PVP-containing aramid pulp used in the present invention generally has a Schopper Riegler (SR) in the range of 15 to 80° SR, in particular in the range of 20 to 60° SR, more in particular in the range of 20 to 40° SR. The SR is a parameter often used in the art of pulp and paper technology. It is a measure of the drainability of a pulp suspension in water. SR can be determined in accordance with ISO5267/1.

The PVP-containing aramid pulp used in the present invention generally has a Canadian Standard Freeness (CSF) in the range of 15 to 700 mL, in particular in the range of 100 to 600 mL, more in particular in the range of 270 to 570 mL. The CSF is a parameter often used in the art of pulp and paper technology. It is a measure of the drainability of a pulp suspension in water. CSF can be determined in accordance with TAPPI T227.

The para-aramid pulp comprising 0.1 to 10 wt. % of polyvinyl pyrrolidone (PVP) can be obtained in various manners. In one embodiment, the PVP containing pulp is obtained by fibrillating short-cut obtained from yarns which contain both PVP and para-aramid. These yarns can be obtained by spinning a solution containing both PVP and aramid polymer. The PVP can be added to an aramid solution, or the aramid can be polymerised in the presence of PVP. Such yarns are, for example, described in U.S. Pat. Nos. 5,399,431 and 6,303,221. In one embodiment, the PVP-containing para-aramid pulps are obtained by a process wherein a fibrous pulp of a combination of para-aramid and PVP is obtained by a process wherein a para-aramid polymerization reaction is carried out in the presence of PVP, and pulp is prepared directly from the solution without intermediate yarn manufacture. This process is described in WO96/10105.

Another method would be to add PVP to a previously prepared aramid pulp. This can, e.g., be carried out by refining aramid short-cut to form a pulp and then adding PVP to a suspension of the aramid pulp.

A further method, which is considered preferred, comprises the steps of combining para-aramid short-cut with PVP in an aqueous solution to form a mixture, and subjecting the mixture to a refining step to form an aramid pulp comprising PVP. This method is the subject of another patent application of the same applicant with the title "Method for manufacturing aramid pulp comprising PVP".

Within the present specification the term para-aramid short-cut refers to para-aramid fibers cut to a length of, e.g., at least 0.5 mm, in particular at least 1 mm, more in particular at least 2 mm, in some embodiments at least 3 mm. The length generally is at most 20 mm, in particular at most 10 mm, more in particular at most 8 mm. The thickness of the short-cut is, e.g., in the range of 5-50 micron, preferably in the range of 5-25 micron, most preferably in the range of 6-18 micron. Para-aramid fibers from which such short-cut can be prepared are commercially available, e.g., from Teijin Aramid®. The length of the shortcut refers to the LL0.25, which is a length-weighted average length wherein particles are included having a length >250 µm, i.e. >0.25 mm.

In the preferred method, para-aramid short-cut is combined with PVP in an aqueous solution to form a mixture. This can be done in a variety of ways. For example, dry short-cut may be added to a solution or suspension of PVP in water, PVP may be added to a suspension of short-cut in water, or PVP and short-cut may be added together to an aqueous medium.

The concentration of PVP in the mixture depends on the amount of PVP desired in the end product and on the amount of PVP that may be lost during operation. The amount of PVP in the end product generally is in the range of 0.1-10 wt. % PVP, calculated on aramid dry weight, in particular 0.5-6 wt. %. The amount of PVP present in the aqueous mixture varies between 0.1 and 15 wt. %, calculated on the dry weight of the aramid short-cut, in particular between 0.5 and 10 wt. %, calculated on the dry weight of the aramid short-cut.

The aqueous mixture comprising PVP and para-aramid short-cut is subjected to a refining step to form an aramid pulp comprising PVP. Refining processes are known in the art. In general, in refining, a short-cut slurry is subjected to a high shear environment, e.g., by passing it between discs which move with respect to each other. The effect of the refining step is to reduce the length of the short-cut, and to fibrillate the short-cut to form pulp. In fibrillation, fibrils will form on the short-cut, which will result in "stems" with fibrils connected thereto and loose fibrils. Further, the stems of the pulp may become kinked during the refining process.

It is possible to carry out a single refining step, but is also possible to subject refined pulp to one or more further refining steps, which are carried out at the same or different conditions as the first refining step.

In the alternative process where PVP is added to an existing para-aramid pulp, para-aramid short-cut can be refined as described above in the absence of PVP. Then, PVP is added thereto, in a concentration range as described above. After mixing, e.g. for at least one minute, or at least 5 minutes, a slurry of PVP-containing pulp will be obtained. A maximum mixing time is not critical. It generally is at most 4 hours, in particular at most 1 hour.

In the alternative process where PVP-containing aramid pulp is obtained from PVP-containing aramid yarn, short-cut of aramid yarn can be refined as described above.

The pulp slurry resulting from the refining process in the various methods may be treated as desired. It can for example be provided to a dewatering step wherein the slurry is dewatered, generally by bringing it onto a sieve or other filtering material. This results in the formation of a dewatered pulp. Dewatered pulp generally has a water content in the range of 40-80 wt. %, specifically 50-70 wt. %. The dewatered pulp can be in the form of a cake (as it originated from the filter), or the cake can be broken to form individual pieces, also indicated as crumb.

The dewatered pulp, in the form of cake or crumb or any other form, can be an end product, which can be further processed as desired. The dewatered pulp can also be dried.

Drying of the dewatered pulp can take place in a conventional manner, e.g. by contacting it with a drying atmosphere, optionally at an elevated temperature, resulting in the formation of dried pulp. Dried pulp generally has a water content in the range of 2 to 20 wt. %, in particular 3 to 10 wt. %.

The dried pulp can, if so desired, be subjected to an opening step. Pulp opening is known in the art. It encompasses subjecting the dried pulp to mechanical impact, e.g., using an impact mill, a mill using turbulent air, or a high shear/high agitating mixer. The pulp opening step decreases the bulk density of the pulp material (i.e., it makes it more "fluffy"). Opened pulp may be easier to disperse and therewith easier to apply. In general, the pulp opening step does not substantially change the properties of the pulp.

The friction paper of the present invention has a grammage in the range of 100-800 g/m2, in particular in the range of 200-600 g/m2.

In the friction paper according to the invention, the PVP-containing aramid pulp will generally be present in an amount of 5 to 60 wt. %. If the percentage of pulp is too low, its effect on the mechanical strength and filler retention will not be obtained. If the amount of pulp is too high, the amount of other components will be too low. It may be preferred for the amount of pulp to be in the range of 5 to 55 wt. %, more in particular in the range of 8 to 45 wt. %, still more in particular in the range of 10 to 35 wt. %.

The friction paper further comprises a filler. Within the context of the present specification the term filler is intended to encompass all particulate materials which influence the friction performance of the paper. Suitable fillers are known in the art. Examples of suitable fillers include refractory organic and inorganic particles such as is calcium carbonate, magnesium carbonate, silicon carbide, titanium carbide, activated carbon, clay, kaolin, zeolite, alumina, silica, barium sulphate, barite powder, and particles derived from renewable resources such as powdered cocoa nutshell and cashew dust. Other examples of suitable filler particles include diatomaceous earth, graphite particles, and copper particles, although use of the latter has generally been discontinued in view of HSE concerns.

It may be preferred for the friction paper to comprise diatomaceous earth and/or graphite particles.

The filler will generally be present in an amount of 5 to 55 wt. %. If the percentage of filler is too low, its effect on the friction properties of the paper will not be obtained. If the amount of filler is too high, the amount of other components will be too low. It may be preferred for the amount of filler to be in the range of 10 to 45 wt. %, more in particular in the range of 20 to 35 wt. %.

The friction paper of the present invention comprises a resin as binder. Suitable resins are known in the art. The resin is generally present in an amount of 5 to 50 wt. %, in particular in an amount of 15 to 40 wt. %. If the amount of resin is too low, the structural integrity of the paper will be affected.

If the amount of resin is too high, the content of other components will be too low. The resin generally is a phenolic resin, which may optionally be modified with for example, silicone, melamine, epoxy, cresol, or cashew oil. Other suitable binder resins include epoxyresins, and melamines. The resin is present to improve the thermal resistance of the paper, its dimensional stability, and its performance in friction and wear.

The friction paper of the present invention may contain further components.

In one embodiment, the friction paper comprises reinforcing fibers, such as carbon fibers, mineral fibers, ceramic fibers, glass fibers, basalt fibers, and mineral wool, or polymer fibers such as acrylic fibers, polyimide fibers and polyamide fibers. Organic fibers like cotton and cellulose are also often used, as fibers or as pulp. It may be preferred for the friction paper according to the invention to comprise one or more of cellulose, cotton, or carbon fiber. Reinforcing fibers are often used to improve the durability and mechanical strength of the paper. If used, they are generally present in an amount of 2 to 40 wt. %, in particular 5 to 35 wt. %. Reinforcing fibers and their use are known in the art.

The friction paper can be manufactured by methods known in the art, in general by a process comprising the steps of manufacturing a paper comprising aramid pulp comprising PVP, resin, and filler, and heating the paper under such conditions that the resin is cured. In one embodiment, in a first step, all components of the paper except for the resin are combined in an aqueous medium to form a slurry. This can be done in any sequence, and the various compounds can be added simultaneously or sequentially. The resulting slurry is applied onto a screen and water is removed. This is conventional in papermaking and requires no further elucidation. The resulting paper is dried. The dried paper is contacted with the resin. Generally the resin is in liquid form and the paper is impregnated with the resin. Depending on the type of resin, the impregnated paper can be submitted to a curing step to cure the resin. Exact process conditions will depend on the nature of the resin, and generally include a temperature in the range of 100 to 300° C. and a pressure of 0.5 to 10 MPa.

In another embodiment, solid resin particles are added to the aqueous medium with the other components, and the resulting slurry is processed to form a paper as described above. The paper is then dried and cured as described above.

As will be evident to the skilled person, the various preferred embodiments as described above can be combined unless they are mutually exclusive.

The invention will be elucidated with reference to the following Examples, without being limited thereto or thereby.

EXAMPLE 1: PULP MANUFACTURE 4 kg of para-aramid chopped fibers of 6 mm in length (6 mm short-cut based on Twaron® type 1000 1680f1000 from Teijin Aramid BV, NL) was added to 200 liter of an aqueous solution of PVP. The PVP had a molecular weight of approximately 50 kg/mol. The resulting medium contained 2 wt. % of aramid short-cut and 0.1 wt. % of PVP. The resulting suspension was passed through a Sprout-Bauer 12" lab refiner until the desired fiber length was obtained. Intermediate samples were taken during the process. The refined suspension was dewatered on a sieve table to yield a dewatered cake. This PVP-pulp is denoted as Pulp A. It contains 5 wt. % of PVP.

As reference, the same procedure was followed without the addition of PVP. This pulp is referred to as Pulp B.

EXAMPLE 2: MANUFACTURE OF A FRICTION PAPER COMPRISING FILLER, RESIN AND PVP-ARAMID PULP ACCORDING TO THE INVENTION 13.86 g of PVP-containing Pulp A with a dry solids content of 19.83%, thus equaling 2.75 g of dry aramid pulp, was suspended in 2 L of water and mixed for 100 counts (20 s at 3000 rpm) in a Lorentzen & Wettre disintegrator. Then, 3.54 g of diatomaceous earth (Celatom MN-23) and 2.97 g of phenolic resin (BAKELITE® PF 0229 RP) were added to the suspension and mixed for an additional 500 counts (100 s at 3000 rpm). This mixture was used for paper sheet preparation on a Rapid Kothen lab sheet former in accordance with ISO 5269-2. The resulting paper sheets were dried between two blotting papers in a plate drier at 90° C. for at least 30 minutes. The dried sheet was then cured in a press between two Teflon sheets. This was performed at 150° C. and a pressure of 0.5 MPa for 3 minutes in total. During the press program, after 1 and 2 minutes, the press shortly opens to avoid pressure build up due to possible release of vapour. The properties of this resulting model friction paper are discussed in Example 4.

EXAMPLE 3: MANUFACTURE OF A COMPARATIVE FRICTION PAPER COMPRISING FILLER, RESIN AND ARAMID PULP

The same procedure as described in Example 2 was followed for pulp B, with the exception that now 15.23 g of the pulp was used at a dry solids content of 18.04%, resulting in the same amount of 2.75 g of dry aramid pulp. The properties of the resulting model friction paper with comparative pulp B are discussed in Example 4.

EXAMPLE 4: COMPARISON OF FRICTION PAPERS

Various properties of the friction papers of Examples 2 and 3 were determined.

1. Paper Yield (Filler Retention)

Paper yield is calculated by dividing the weight of the final cured paper by the dry weight of the initial raw materials (pulp, resin and fillers) and multiplying by 100%. The paper yield is thus a measure of how much filler and resin is lost during the paper-making process (the loss of pulp during the paper-making process on a sheet former is negligible). The paper yield is based on the average of two sheets. The results are presented in the table below.

| Sheet based on | Paper yield sheet 1 [%] | Paper yield sheet 2 [%] | Average paper yield [%] |
| --- | --- | --- | --- |
| Pulp A | 72.2 | 71.4 | 71.8 |
| Pulp B | 58.0 | 57.3 | 57.7 |

From the table it can be seen that the paper yield for the paper prepared with Pulp A according to the invention is substantially higher than the paper yield for the paper prepared from comparative Pulp B. Apparently, Pulp A according to the invention is more capable of retaining the filler and resin particles than comparative pulp B.

2. Strength Properties

For friction applications, shear strength and Z-strength (as measure for internal bonding) are the most important strength properties, due to the high shear forces during operation. Samples have been taken from the sheets obtained from pulp A and Pulp B in Examples 2 and 3, and have been subjected to both a shear test and a Z-test. Tests were carried out in accordance with Tappi T541 and ASTM D-5868-95. The results are presented in the following table.

| Sheet | Z-strength (Fmax) [kPa] | | Shear strength (tensile stress at max load) [kPa] | |
| --- | --- | --- | --- | --- |
| based on | Avg | SD | Avg | SD |
| Pulp A | 254 | 4 | 563 | 73 |
| Pulp B | 110 | 7 | 250 | 23 |

From this table it can be seen that that the strength of the model friction paper based on Pulp A according to the invention is greatly improved as compared to the strength of model friction paper based on comparative Pulp B.

3. Friction Coefficients

Friction properties for Pulp A and Pulp B were obtained using Bruker's UMT Tribolab, equipped with a rotary drive module, a temperature chamber for the rotary drive, and special wet-friction clutch testing kit. Samples were prepared by punching rings out of the friction papers described in Examples 2 and 3, and fixing them to steel sample holders using a resin, similar to the process used in industry to prepare friction plates. For both friction papers described in Examples 2 and 3, respectively, three samples (i.e. friction paper on steel sample holder) were prepared for a friction test.

Fresh automatic transmission fluid (Pentosin FFL-2) was used at the beginning of each friction test and was pumped around at constant flow. The friction test of a single sample consisted of repeating a programmed sequence (in which e.g. pressure and speed was varied) 10 times at 40° C. The first 5 times were considered as run-in, as evidenced by decreasing friction coefficients from one run to the next. The measured friction coefficients of the 14-step-speed test at 2 different pressures of the last 5 runs are averaged at each speed for each sample. The results of the three different samples measured for each friction paper type are averaged at each speed, and are presented in the FIG. 1.

From FIG. 1 it can be seen that the friction coefficient of friction paper based on pulp A (invention) is higher than for friction paper based on pulp B (reference) for almost all speeds at both pressures. Moreover, the static friction coefficient (as speed approaches zero) of friction paper based on pulp A (invention) is lower than the dynamic friction coefficient (i.e. positive slope at low speeds), which is generally considered positive for driving comfort (reduced shuddering).

The invention claimed is:

1. Friction paper comprising:
    filler,
    para-aramid pulp, and
    resin, wherein the para-aramid pulp comprises 0.1 to 10 wt. % of polyvinyl pyrrolidone (PVP), the paper having a grammage in the range of 100 to 800 g/m2.

2. Friction paper according to claim 1, wherein the para-aramid is poly(paraphenylene terephthalamide).

3. Friction paper according to claim 1, wherein the para-aramid pulp comprises 0.5 to 6 wt. % of polyvinyl pyrrolidone (PVP).

4. Friction paper according to claim 1, wherein the PVP-containing para-aramid pulp has a length ($LL_{0.25}$) in the range of 0.7 to 1.5 mm.

5. Friction paper according to claim 1, wherein the PVP-containing para-aramid pulp has a Schopper Riegler (SR) in the range of 15 to 80° SR.

6. Friction paper according to claim 1, wherein the PVP-containing para-aramid pulp has a Canadian Standard Freeness (CSF) in the range of 15 to 700 mL.

7. Friction paper according to claim 1, wherein the PVP-containing para-aramid pulp is prepared by a process comprising the steps of
    combining para-aramid short-cut with PVP in an aqueous solution to form a mixture,
    subjecting the mixture to a refining step to form a para-aramid pulp comprising PVP.

8. Friction paper according to claim 1, which has a grammage in the range of 200-600 g/m2.

9. Friction paper according to claim 1, wherein the PVP-containing aramid pulp is present in an amount of 5 to 60 wt. %.

10. Friction paper according to claim 1, wherein the filler is present in an amount of 5 to 55 wt. %.

11. Friction paper according to claim 1, wherein the resin is present in an amount of 5 to 50 wt. %.

12. Friction paper according to claim 1, wherein the resin is a phenolic resin.

13. Friction paper according to claim 1, wherein the paper further comprises reinforcing fibers, generally in an amount of 2 to 40 wt. %.

14. Method for manufacturing a friction paper according to claim 1, comprising the steps of manufacturing a paper comprising aramid pulp comprising PVP, resin, and filler, and heating the paper under such conditions that the resin is cured.

\* \* \* \* \*